May 5, 1925.
W. A. STACEY
PANEL BOARD INSTALLATION
Filed May 25, 1922
1,536,979
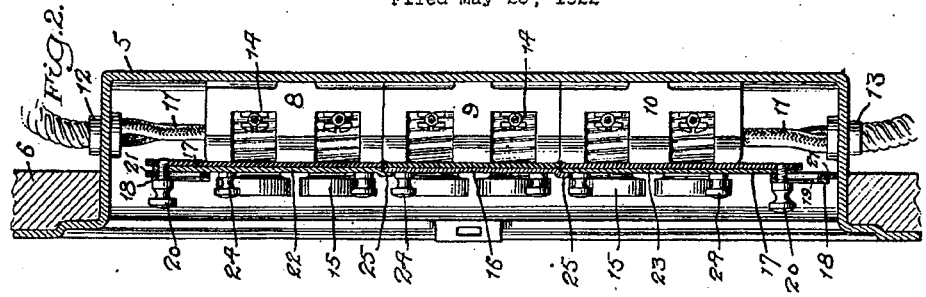
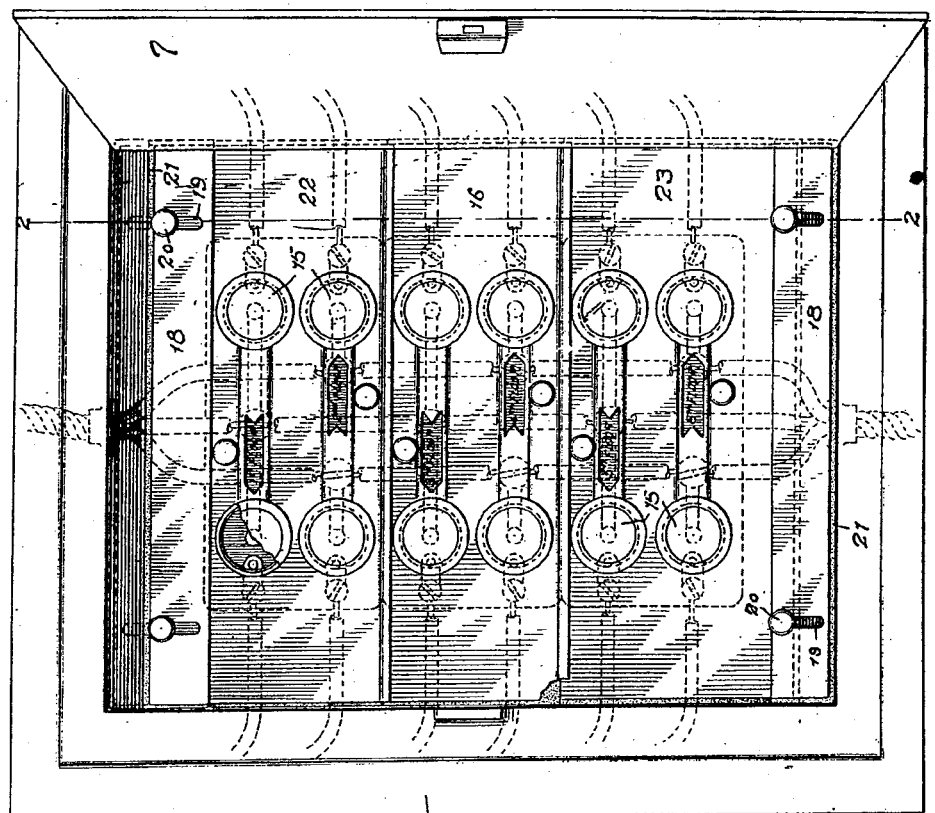
INVENTOR
WILLIAM A. STACEY
BY
ATTORNEYS Patented May 5, 1925.

1,536,979

UNITED STATES PATENT OFFICE.

WILLIAM A. STACEY, OF CHICAGO, ILLINOIS, ASSIGNOR TO THE BRYANT ELECTRIC COMPANY, OF BRIDGEPORT, CONNECTICUT, A CORPORATION OF CONNECTICUT.

PANEL-BOARD INSTALLATION.

Application filed May 25, 1922. Serial No. 563,652.

*To all whom it may concern:*

Be it known that I, WILLIAM A. STACEY, a citizen of the United States of America, residing at Chicago, in the county of Cook and State of Illinois, have invented certain new and useful Improvements in Panel-Board Installations, of which the following is a specification.

My invention relates to panel-board installations, and particularly to an installation built up from a plurality of panel-board units, together with insulating covers affording what is commonly known as a "dead front" panel. The object of my invention is to provide cover means for an installation of this type, by which it may be adapted to panel-board boxes of various lengths, while still insuring the complete cover of exposed conductors.

In the accompanying drawings—

Fig. 1 is a broken front elevation of a panel-board box within which is mounted a group of unit cut-out blocks having covers of a form embodying the invention; and Fig. 2 is a section on the line 2—2, Fig. 1.

The installation illustrated is of the flush casing type, comprising a box body 5, the margins of which are set substantially flush with the wall 6, and provided with an outwardly opening hinged door 7. Secured to the bottom of the box is a series of branch cut-outs 8, 9 and 10, of standard type, transversely grooved to receive the mains 11 which enter the box at one end through the bushing 12 and emerge at the opposite end bushing 13. Branch connections are established through wire terminals 14 of usual type, protective fuses 15 being interposed in the branch connections as customary.

It will be noted that the cut-out units, of which only three, 8, 9 and 10 are here shown, do not completely fill the box 5, and that the mains 11 extend beyond the ends of the installation. It has been customary heretofore to provide such units with protective covers of the type illustrated at 16 for the unit 9, which are substantially co-extensive with the insulating bases of the cut-out blocks with which they are associated. Obviously, if the end cut-out units 8 and 10 were provided with covers of similar character, the wire mains 11 at the ends of the installation would be exposed and constitute a possible source of danger. To avoid this I provide covers of special shape for these end units 8 and 10 of the installation.

As here shown, these special covers comprise extensions 17 which overhang the blocks 8 and 10 and partially overlie the exposed mains 11 between these blocks and the opposite ends of the box 5. While these overhangs may afford sufficient protection for boxes of certain dimensions, there is such variation in the dimensions of standard boxes manufactured by various makers that a fixed overhang will not take care of all conditions. I therefore provide an additional shutter 18 mounted on the overhang 17 and adapted for extension beyond the edge of the overhang to substantially completely overlie the exposed mains 11 and thus prevent accidental access thereto by the attendant. Any suitable means may be provided for securing the shutters to the covers. For example, they may be slotted at 19 to receive the shanks of clamping screws 20 which take into tapped holes in the overhang 17 of each cover.

As will be observed, each shutter comprises a protective metal front lined with insulation 21, which projects beyond the outer edge of the shutter. Should the latter be extended outward sufficiently to engage the end wall of the box 5, the insulating lining engages the latter and there is consequently no danger of current reaching the metal plate of the cover should the box 5 be charged with current through defective insulation of the wires.

The end covers 22 and 23 are secured to their respective cut-out blocks 8 and 10 by the usual clamping screws 24 in the same fashion as that commonly employed for securing the standard covers 16 in position. There is no necessity for alteration of the blocks 8 and 10 to permit the use of these special end covers. In order that these covers 22 and 23 may properly cooperate with the standard cover 16 of the block 9, the cover 22 is provided at one edge with a raised lip 25 which makes a lap joint with one edge of the cover 16. The cover 23, on the other hand, is lapped by the lip 25 of the standard cover 16, and inasmuch as the cut-out block 10 forms one end of the installation, the extension edge of the cover 23 is continued in the same plane as the body thereof.

The construction shown may be varied in many ways without departing from my invention, my object being to provide a unit panel-board installation with a protective cover, the ends of which are adjustable to accommodate the cover to the varying dimensions of standard cut-out boxes. It is possible to provide a cover common to the group of branch cut-outs rather than to utilize a separate cover for each unit, and in such case the cover at one or both ends would be provided with an adjustable extension shutter for the purpose set forth.

It is obvious that various other modifications in details of structure may be provided, without departing from what I claim as my invention.

I claim—

1. In a multi-unit panel installation, a casing, a plurality of juxtaposed cut-out units mounted within the casing, a protective cover for each unit, an extension for the cover of the end unit, and means adjustably securing said extension to said cover in a plane substantially parallel with the latter and in extension thereof to overlie conductors extending beyond the end of the installation.

2. A panel-board installation comprising a casing, a plurality of juxtaposed cut-out units mounted within the casing, protective cover means overlying said units and secured thereto, together with an adjustable extension for the cover of the end unit to prevent access to conductors leading to the end of the installation.

3. A panel-board installation comprising a casing, a plurality of juxtaposed cut-out units mounted within the casing, protective cover means overlying said units and secured thereto, together with an adjustable extension for the cover of the end unit to prevent access to conductors leading to the end of the installation, said extension being carried by and adjustably secured to said cover means.

4. A cover for a panel-board unit of the type described, said cover being substantially coincident at one margin with the side of the fitting which it overlies, but projecting substantially beyond the opposite side of the fitting to overlie the conductors extending beyond the latter, together with an adjustable shutter associated with said projecting portion of the cover and adapted to further extend the area of the cover.

5. A cover for a panel-board unit, said cover having an adjustable marginal extension comprising a sheet metal plate and an insulating lining therefor, said lining projecting beyond the margin of the plate.

6. A cover for a panel-board unit comprising a metal cover plate projecting beyond the margin of the unit, and an adjustable extension shutter carried by said projecting portion of the cover plate, said shutter comprising a metal plate and an insulating lining projecting beyond the margin thereof.

In testimony whereof I have signed my name to this specification.

WILLIAM A. STACEY.